US010979328B2

(12) United States Patent
Gray et al.

(10) Patent No.: US 10,979,328 B2
(45) Date of Patent: Apr. 13, 2021

(54) RESOURCE MONITORING

(71) Applicant: Intel Corporation, Santa Clara, CA (US)

(72) Inventors: Mark D. Gray, Dublin (IE); John J. Browne, Limerick (IE); Maryam Tahhan, Limerick City (IE)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 15/475,864

(22) Filed: Mar. 31, 2017

(65) Prior Publication Data

US 2018/0287911 A1     Oct. 4, 2018

(51) Int. Cl.
*H04L 12/26*     (2006.01)
*H04L 12/931*    (2013.01)

(52) U.S. Cl.
CPC ...... *H04L 43/0811* (2013.01); *H04L 43/0817* (2013.01); *H04L 49/70* (2013.01)

(58) Field of Classification Search
CPC ..................... H04L 43/0811; H04L 43/106
See application file for complete search history.

(56) References Cited

U.S. PATENT DOCUMENTS

| | | | | |
|---|---|---|---|---|
| 6,047,330 | A | * | 4/2000 | Stracke, Jr. ............. H04L 41/12 370/409 |
| 2010/0027415 | A1 | * | 2/2010 | So ........................... H04L 45/50 370/225 |
| 2011/0228669 | A1 | * | 9/2011 | Lei ......................... H04L 45/586 370/219 |
| 2013/0346470 | A1 | * | 12/2013 | Obstfeld ................. G06F 9/5044 709/202 |
| 2014/0280437 | A1 | * | 9/2014 | Eder ....................... H04L 67/10 709/201 |
| 2015/0234682 | A1 | * | 8/2015 | Dageville ........... G06F 16/2365 718/104 |
| 2016/0019130 | A1 | * | 1/2016 | Kruglick ............. G06F 11/2033 714/11 |
| 2017/0048352 | A1 | * | 2/2017 | Imamura ............... G06F 16/182 |
| 2017/0195261 | A1 | * | 7/2017 | Choi ....................... H04L 45/54 |
| 2018/0183667 | A1 | * | 6/2018 | Dubey ................. H04L 41/0663 |
| 2019/0068561 | A1 | * | 2/2019 | Caragea ..................... H04L 9/14 |
| 2020/0036624 | A1 | * | 1/2020 | Michael ................. H04L 45/24 |

* cited by examiner

*Primary Examiner* — Zhiren Qin
(74) *Attorney, Agent, or Firm* — Patent Capital Group

(57) ABSTRACT

Particular embodiments described herein provide for a network element that can be configured to receive a link monitoring message, determine one or more resources associated with the link monitoring message, determine a status of each of the one or more resources, and send a response that provides an indication of the status of each of the one or more resources. In an example, the link monitoring is part of a bidirectional forwarding detection packet.

20 Claims, 5 Drawing Sheets

| 124 | 126 | 128 | 130 | 132 | 134 |
|---|---|---|---|---|---|
| PROCESS | RESOURCE_A | RESOURCE_B | RESOURCE_C | RESOURCE_D | RESOURCE_E |
| PROCESS_A | -- | -- | -- | NULL | -- |
| PROCESS_B | -- | NULL | NULL | -- | -- |
| PROCESS_C | NULL | -- | -- | -- | -- |
| PROCESS_D | -- | -- | -- | -- | NULL |

| 138 | 140 | 142 | 144 | 146 |
|---|---|---|---|---|
|  | RESOURCE_A | RESOURCE_B | RESOURCE_C | RESOURCE_E |
| PROCESS_A | PASS | FAULT | NO RESPONSE | 75% |

RESOURCE MONITORING

TECHNICAL FIELD

This disclosure relates in general to the fields of computing and/or networking, and more particularly, to resource monitoring.

BACKGROUND

High-performance computers are built of many processors/cores connected by a network, often called a "fabric." Application performance depends on good use of the network or fabric. One way to monitor the network or fabric is using link monitoring protocols. Link monitoring protocols exchange messages in order to determine that a remote link is still active or is able to execute a process. One potential issue with using a network or fabric is that many different devices and resources may be used during the execution of a process and the different devices and resources may not be on the same link or device. Link monitoring protocols were originally envisaged to provide fault detection for physical forwarding engines but do not take into consideration support resources, all the resources needed for the execution of the process, and/or virtual embodiments of the resources or forwarding engine

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram of a table for use in a communication system for resource monitoring, in accordance with an embodiment of the present disclosure;

FIG. 3 is a simplified block diagram of a portion of message for use in a communication system for resource monitoring, in accordance with an embodiment of the present disclosure;

The FIGURES of the drawings are not necessarily drawn to scale, as their dimensions can be varied considerably without departing from the scope of the present disclosure.

DETAILED DESCRIPTION

Example Embodiments

The following detailed description sets forth example embodiments of apparatuses, methods, and systems relating to a communication system for enabling resource monitoring. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
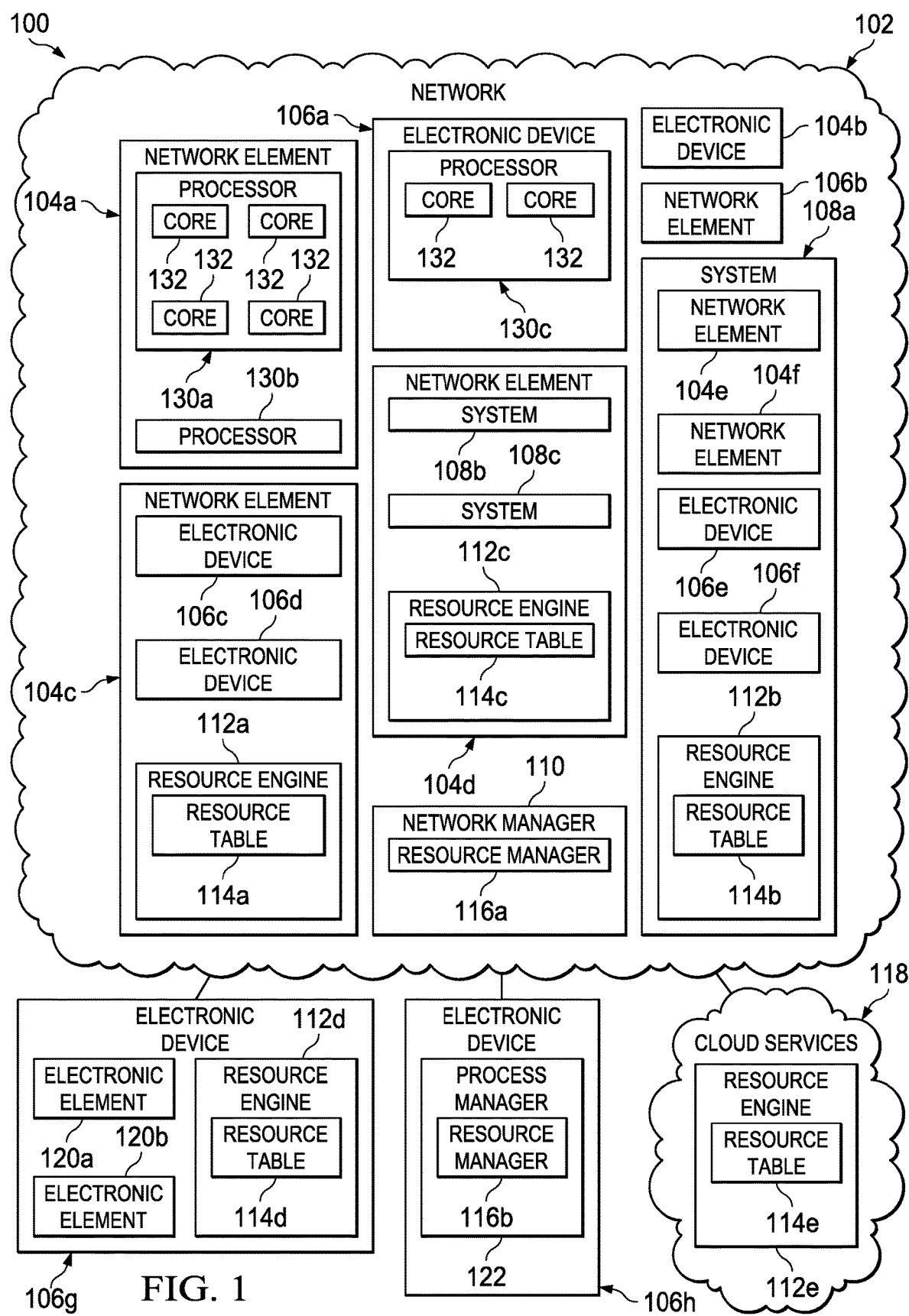
FIG. 1 is a simplified block diagram of a communication system for resource monitoring, in accordance with an embodiment of the present disclosure.

FIG. 1 is a simplified block diagram of a communication system 100 to enable resource monitoring, in accordance with an embodiment of the present disclosure. Communication system 100 can include a network 102. Network 102 can include one or more network elements 104a-104d, one or more electronic devices 106a and 106b, one or more systems 108a, and a network manager 110. In an example, one or more electronic devices 106g and 106h and cloud services 118 may be in communication with network 102.

Each network element 104a-104d can include one or more electronic devices 106c-106f, one or more systems 108b-108c, one or more processors 130a-130c, and a resource engine 112a-112c. Each processor 130a-130c can be a multi-core processor. The term "multi-core processor" includes a single computing component with two or more independent actual processing units (e.g., cores 132). Each resource engine 112a-112c can include a resource table 114a-114c respectively. Electronic device 106g can include one or more electronic elements 120a and 120b and a resource engine 112d. Resource engine 112d can include a resource table 114d. Electronic device 106h can include a process manager 122. Process manager 122 can include a resource manager 116b. System 108a can include one or more network elements 104e and 104f, one or more electronic devices 106e and 106f, and a resource engine 112b. Resource engine 112b can include a resource table 114b. In an example, each of network elements 104e and 104f may be similar to network elements 104c and 104d. For example, network element 104e in system 108a can include one or more electronic devices, one or more systems, one or more processors, and a resource engine. Each of electronic devices 106a-106d may be similar to electronic device 106g. For example, electronic device 106a can include one or more electronic elements, one or more processors, and a resource engine. Each of systems 108b and 108c may be similar to system 108a. For example, system 108b can include one or more network elements, one or more electronic devices, and a resource engine. Cloud services can include a resource engine 112e. Resource engine 112e can include a resource table 114e. It is to be understood that other embodiments may be utilized and structural changes may be made without departing from the scope of the present disclosure. Substantial flexibility is provided by communication system 100 in that any suitable arrangements and configuration may be provided without departing from the teachings of the present disclosure. Each of network elements 104a-104c, electronic devices 106a-106h, systems 108a-108c, and cloud services 118 may be a remote link monitoring protocol endpoint.

In an example, communication system 100 can be configured to determine if resources that are to be used during execution of a process are functioning or at least functioning on an acceptable level. The term "resource" includes any network element, system, electronic device, cloud service, processor, core of a multi-core processor, virtual machine, memory, input/output (I/O) device, operating system services, processes, daemons, etc. that may be used to execute a process and/or may be grouped together or are related. In addition, communication system 100 can be configure to determine a status for a group of one or more related resources (e.g. a group of resources used as part of a communication path, vendor specific resources, resources that may be suspected in create a fault, error or slowdown of traffic or data processing in communication system 100, etc.). In a specific example, communication system 100 can use a link monitoring message or an external link monitoring protocol procedure, with a co-operative forwarding plane validation process, to determine if key virtual switching resources related to a process are functioning. The term "link monitoring message" includes a message sent from one device to determine the status or data related to another device. For example, a link monitoring message may be a ping, part of a bidirectional forwarding detection (BFD) request, some other link monitoring message used by a link monitoring protocol, part of a link monitoring protocol control packet, etc. The link monitoring message is limited to fault detection for the device receiving the link monitoring message and does not take into consideration support resources for the device that receives the link monitoring message.

In a specific illustrative example, a device (e.g., network elements 104a-104c, electronic devices 106a-106h, systems 108a-108c, cloud services 118, etc.) can be configured to receive a link monitoring message (e.g., from resource manager 116a), determine one or more resources associated with the link monitoring message, where at least one of the one or more resources is located in another or a second device, determine a status of each of the one or more resources, and send a response (e.g., back to resource manager 116a) that provides an indication of the status of each of the one or more resources.

A resource table (e.g., resource table 114a) located in the device that received the link monitoring message can be used to determine the one or more resources associated with the process. In an example, at least one of the resources is a core (e.g., core 132) from a multi-core processor (e.g., processor 106a). In addition, at least one of the resources is a virtual machine (e.g., network element 104c may be a virtual machine). In some examples, the device is a virtual switch. Also, the response to the link monitoring message can include data related to the status of each resource.

If network 102 or a portion of network 102 is a fabric network, network manager 110 can be configured as a fabric manager. Resource manager 116a and 116b can be configured to manage resources in communication system 100. Each of resource engines 112a-112e can be configured to receive a request to execute a process from resource manager 116a or 116b, determine the resources associated with the request to execute the process, and query the resources to determine a status for each resource. In addition, each of resource engines 112a-112e can be configured to summarize or process the determined status for each resource and respond to the request to execute the process from resource manager 116a or 116b.

Each of resource tables 114a-114e can include a list the resources that are associated with a process and/or the resources that may be grouped together or are related. For example, as illustrated in FIG. 2, to execute process_B, resource_A (e.g., network element 104a), resource_D (e.g., electronic device 106a), and resource_E (e.g., system 108a) may be required. In another example, network element 104b and 104d, system 108a, and electronic device 106b may be a group of resources that are used as part of a communication path, are vendor specific or have a common service provider, may be suspected in create a fault, error, or slowdown of traffic or data processing in communication system 100, etc.

For purposes of illustrating certain example techniques of communication system 100, it is important to understand the following foundational information may be viewed as a basis from which the present disclosure may be properly explained. High-performance computers are built of many processors/cores connected by a network, often called a "fabric". Application performance of the network often depends on good use of the fabric. Link monitoring protocols (e.g., BFD) are network protocols used to detect faults between two forwarding engines connected by a link. Link monitoring protocols exchanges messages (e.g., link monitoring messages) in order to determine that the remote link is still active or is able to execute a process. One issue with using a fabric is that many different devices and resources may be used during the execution of a process and the different devices may not be on the same link or device. Link monitoring protocols were originally envisaged to provide fault detection for physical forwarding engines but do not take into consideration support resources, all the resources needed for the execution of the process, and/or virtual embodiments of the resources or forwarding engine (e.g., multicore general purpose CPU architectures).

One example of this is virtual switching. In this example, a link monitoring protocol is typically handled by a control plane entity. The control plane entity will handle any messages received by the remote link monitoring protocol endpoint and reply with an appropriate message. The remote link monitoring protocol endpoint can detect general system failures or failures that cause the control plane entity to stall or crash. However, in a multithreaded or multi-resource architecture, multiple threads and/or multiple resources may contribute to a forwarding engine failure.

BFD can be an important link monitor protocol because it is not tied to any particular routing protocol and can be used as a generic and consistent failure detection mechanism for enhanced interior gateway routing protocol (EIGRP), intermediate system to intermediate system (IS-IS), and open shortest path first (OSPF), etc. However, current implementations of BFD do not take into account a multi-core CPU architecture or multiple resources and can only provide an indication of the link status of the link connecting two forwarding entities (e.g., the device that sent the link monitoring message and the device that received the link monitoring message). Also, the link status alone only determines the state of the receiving device or port. It is possible that the current core, other resources needed for the process, and/or CPU, could be malfunctioning or otherwise compromised. A link status of acceptable or OK could be sent in response to the status inquiry while the rest of the resources required for the process are compromised, not working, or unable to allow execution of the process. In other words, in current implementations, the BFD responses are automatically generated without a check on supporting resources. In addition, an external entity sending the link monitoring message may interpret a no response as a failure and then perform a path or route recovery procedure, without requiring further interaction.

A communication system with resource monitoring, as outlined in FIG. 1, can resolve these issues (and others). Communication system 100 may be configured with technology of the present disclosure to check the status of resources needed to execute a process, including all key resources such as virtual switch components (e.g., one or more of network elements 104a-104d may be a network virtual switch component or include a virtual switch component), as well as resources not required to respond to the link monitoring message.

One difference from existing systems (e.g., the standard BFD process) and communication system 100 is that communication system 100 can be configured to monitor the resources needed to execute a process (e.g., multi-core resources which comprise a virtual switch entity) and present an overall health of the group of resources as a response to a single BFD request. Communication system 100 can allow the network to quickly detect faults, or potential faults, independent of the port and core on which the BFD requests are received. A resource engine (e.g., resource engine 112a) can be configured to check internal and external hardware and software resources across all resources and CPU cores composing a virtual switch entity before responding.

For example, resource engine 112a-112e can each take into consideration all resources needed for executing a process, including threads in a multithreaded implementation, when responding to a link monitoring message and when monitoring for faults. The system is not limited to the detection of faults that cause crashes of processes or threads and can detect thread stalls. Reliability can scale with the number of resources and cores, as each resource and core is prevented from failing silently. In an example, a link monitor message response is suppressed if any key resource (such as a forwarding core) has failed. Communication system 100 can work for almost any dedicated link monitoring protocols that include a link monitoring message such as link state protocol data units (PDUs), BFD, link layer discovery protocol (LLDP), 802.1ag link monitoring, etc.

Communication system 100 can reliability scale with the number of resources necessary for the execution of a process, as each resource and core can be prevented from failing silently through regular status requests or link monitoring messages. In communication system 100, using a BFD type implementation, the reliability of the overall system can be improved to enable network recovery to react to faults that normally would not be detectable. In an example, communication system 100 can help ensure that a link monitoring protocol/forwarding detection protocol, such as BFD, behaves correctly in a multicore and/or multi-resource environment. In a specific example, a physical forwarding engine is implemented in the control plane of a device. BFD frames are directed to the control plane for processing by the BFD endpoint (e.g., network elements 104a-104c, electronic devices 106a-106h, systems 108a-108c, or cloud services 118). Any failure of the link, data plane, control plane, or BFD endpoint implementation will be correctly detected by the BFD endpoint. A resource engine (e.g., resource engine 112a) can be configured to monitor all data plane processing threads on the system either directly or through another process in order to maintain an accurate view of the current status of the resources or forwarding engine. All data plane failures, including stalls, can be correctly detected by the resource engine. The process is equally valid for BFD asynchronous mode or demand mode. In an example, the resource engine can periodically validate that all resources are active. In a specific example, when a BFD control packet is received from the remote BFD endpoint (e.g., network elements 104a-104c, electronic devices 106a-106h, systems 108a-108c, or cloud services 118), the resource engine determines its current system state based on the current state of each resource. The endpoint may then decide to send a reply based on the current system state.

Elements of FIG. 1 may be coupled to one another through one or more interfaces employing any suitable connections (wired or wireless), which provide viable pathways for network (e.g., network 102, etc.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Turning to the infrastructure of FIG. 1, communication system 100 in accordance with an example embodiment is shown. Generally, communication system 100 may be implemented in any type or topology of networks. Network 102 represents a series of points or nodes of interconnected communication paths for receiving and transmitting packets of information that propagate through communication system 100. Network 102 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Cloud services may generally be defined as the use of computing resources that are delivered as a service over a network, such as the Internet. Typically, compute, storage, and network resources are offered in a cloud infrastructure, effectively shifting the workload from a local network to the cloud network.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. The term "status" is to include the operating state of a resource, congestion of the network, data related to traffic or flow patterns of the network, or another type of data or information that helps to determine the performance, state, condition, etc. of a resource or the network, either overall or related to one or more resources. Additionally, messages, requests, responses, and queries are forms of network traffic, and therefore, may comprise packets, frames, signals, data, etc.

In an example implementation, network elements 104a-104c, electronic devices 106a-106h, systems 108a-108c, and cloud services 118 are meant to encompass network appliances, servers, routers, switches, gateways, bridges, load balancers, processors, modules, or any other suitable device, component, element, or object operable to exchange information in a network environment. Network elements 104a-104c, electronic devices 106a-106h, systems 108a-108c, and cloud services 118 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 104a-104c, electronic devices 106a-106h, systems 108a-108c, and cloud services 118 may be virtual or include virtual elements.

In regards to the internal structure associated with communication system 100, each of network elements 104a-104c, electronic devices 106a-106h, systems 108a-108c, and cloud services 118 can include memory elements for storing information to be used in the operations outlined herein. Each of network elements 104a-104c, electronic devices 106a-106h, systems 108a-108c, and cloud services 118 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of communication system 100, such as network elements 104a-104c, electronic devices 106a-106h, systems 108a-108c, and cloud services 118 may include software modules (e.g., resource engine 114a-114e, resource manager 116a and 116b, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 104a-104c, electronic devices 106a-106h, systems 108a-108c, and cloud services 118 may include a processor (or core of a processor) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Turning to FIG. 2, FIG. 2 is a simplified block diagram of a resource table for use in communication system 100, in accordance with an embodiment of the present disclosure. As illustrated in FIG. 2, resource table 114 can include a process identifier column 124 and resource identification columns 126-134 that indicate what resources a specific process may need to execute. For example, process_A needs resource_A, resource_B, resource_C, and resource_E to execute. Process_A does not need resource_D to execute. If a status message or link monitoring message is received for process_A, a resource engine (e.g., resource engine 112a) can use a resource table (e.g., resource table 114a) to determine that process_A needs resource_A, resource_B, resource_C, and resource_E and can determine the status of resource_A, resource_B, resource_C, and resource_E. Once the status of each resource is determined, a reply message to the status message or the link monitoring message can be sent. Each of resource_A-resource_E can be any network element, system, electronic device, cloud service, processor, core of a multi-core processor, virtual machine, operating system services, processes, daemons, etc. that may be used to execute a process and/or may be grouped together or are related Turning to FIG. 3, FIG. 3 is a simplified block diagram of a portion of message (e.g., a response to a link monitoring message) for use in a communication system 100, in accordance with an embodiment of the present disclosure. As illustrated in FIG. 3, a reply message 136 can be sent after the status of the resources needed to execute a process are determined. Reply message 136 can include a process identifier 138 and resource status columns 140-146 that indicate the status of each resource a specific process may need to execute. In an embodiment, the reply message may be a simple pass or fail response that indicates if all the resources needed to execute the process are active or pass a predetermined test. If one resource fails, then the reply message can be a fail or some other similar indicator indicating that at least one of the resources needed for the process is not working.

In another embodiment, reply message 136 can include additional details as illustrated in FIG. 3. For example, for each resource used by process_A, reply message 136 may include a pass or fail indication as illustrated in resource_A status 140 for resource_A. In another example, reply message 136 may include a fault or error indication as illustrated in resource_B status 142 for resource_B. If a response does not reply to a status request, reply message 136 may include a no response indicator as illustrated in resource_C status 142 for resource_C. In another example, reply message 136 may include a percentage indicator or some other type of indicator other than pass or fail to indicate the level or operating status of a resource as illustrated in resource_E status 146 for resource_E. For example, the status may be related to resource load or overload, core resource available compute capacity, the fill or load of a buffer or memory, amount of traffic through a resource, a thermal status check, core/CPU temperature, cooling fan speed, electro-mechanical/core characteristics, core resource available compute capacity, etc. In an embodiment, resource manager 116a or 116b (illustrated in FIG. 1) can use the data in reply message 136 and determine if another path or group of resources should be used to execute the process. For example, if resource_B generated a fault, that may be a critical error and another path or group of resources may be needed to execute the process. If no response was received from resource_C and/or resource_E was at seventy percent (70%), those may not be critical errors and another path or group of resources may not be needed to execute the process. Reply message 136 can include one or more or any combination of the additional details illustrated in FIG. 3 or other data indicating the status of a resource.

Figure 4:
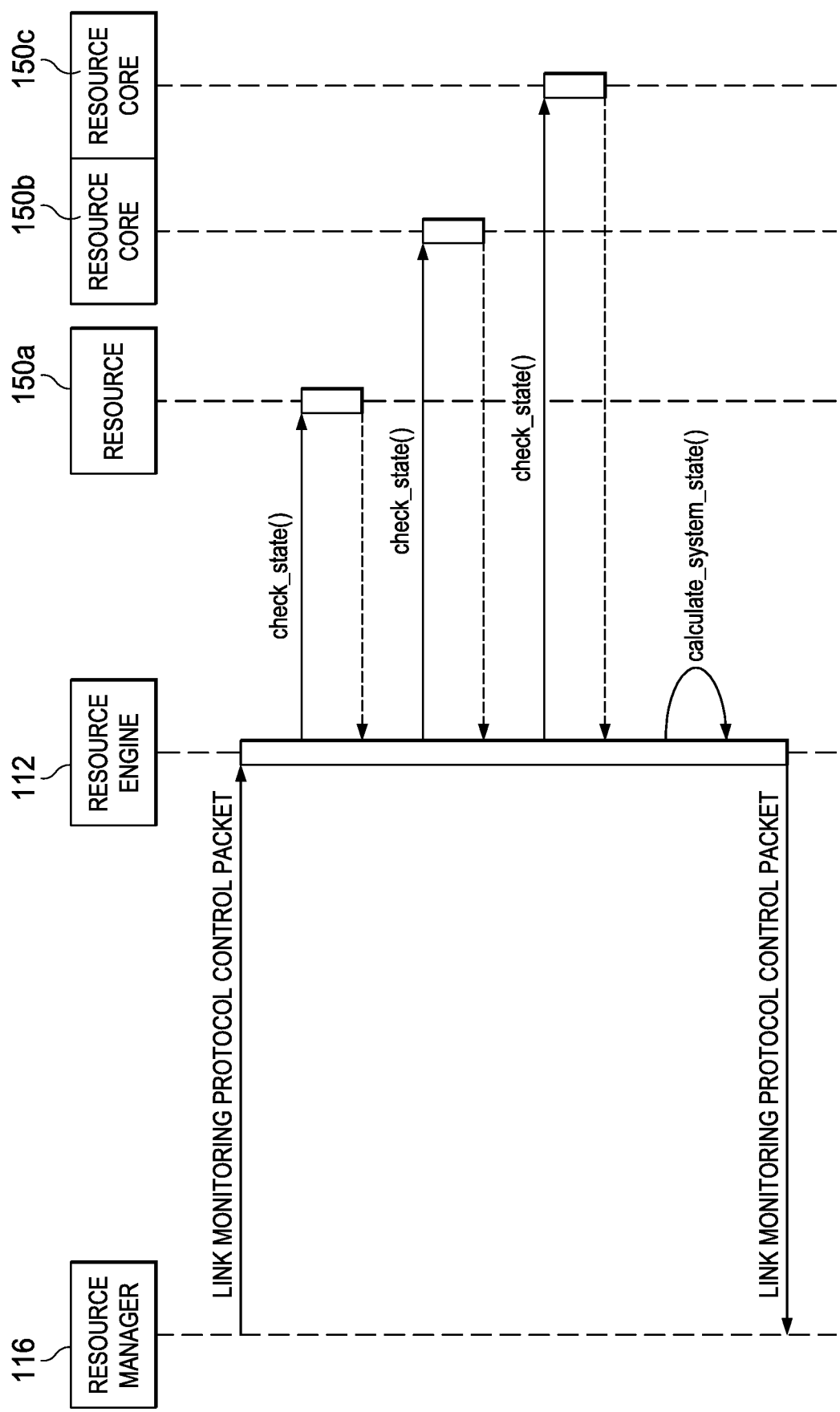
FIG. 4 is a simplified timing diagram illustrating potential operations that may be associated with the communication system in accordance with an embodiment.

Turning to FIG. 4, FIG. 4 is an example timing diagram illustrating possible operations that may be associated with communication system 100, in accordance with an embodiment. In an example, resource manager 116 can communicate a link monitoring protocol control packet to resource engine 112. Resource engine 112 can be located in a network element (e.g., network element 104c), system (e.g., system 108a), electronic device (e.g., electronic device 106a), or cloud services 118.

Resource engine 112 can determine what resources are associated with the link monitoring protocol control packet and send a status or check state message to each resource. For example, resource engine 112 can use resource table 114 to determine the resources that are associated with the link monitoring protocol control packet. As illustrated in FIG. 4, resource engine 112 can sent a check state message to a resources 150a-150c and each resource can respond back to resource engine 112. Resource engine 112 can use the responses to calculate the state of the resources that are associated with the link monitoring protocol control packet and send a single response back to resource manager 116. The response may be a simple pass or fail response or may include additional information as illustrated in FIG. 3. In an example, resource engine 112 can be configured to perform a time series or integration operation. More specifically, resource engine 112 can be configured to determine that a resource has failed or is otherwise compromised even if the reported status or response indicates a pass or OK because the status or state of the resource changes rapidly.

Figure 5:
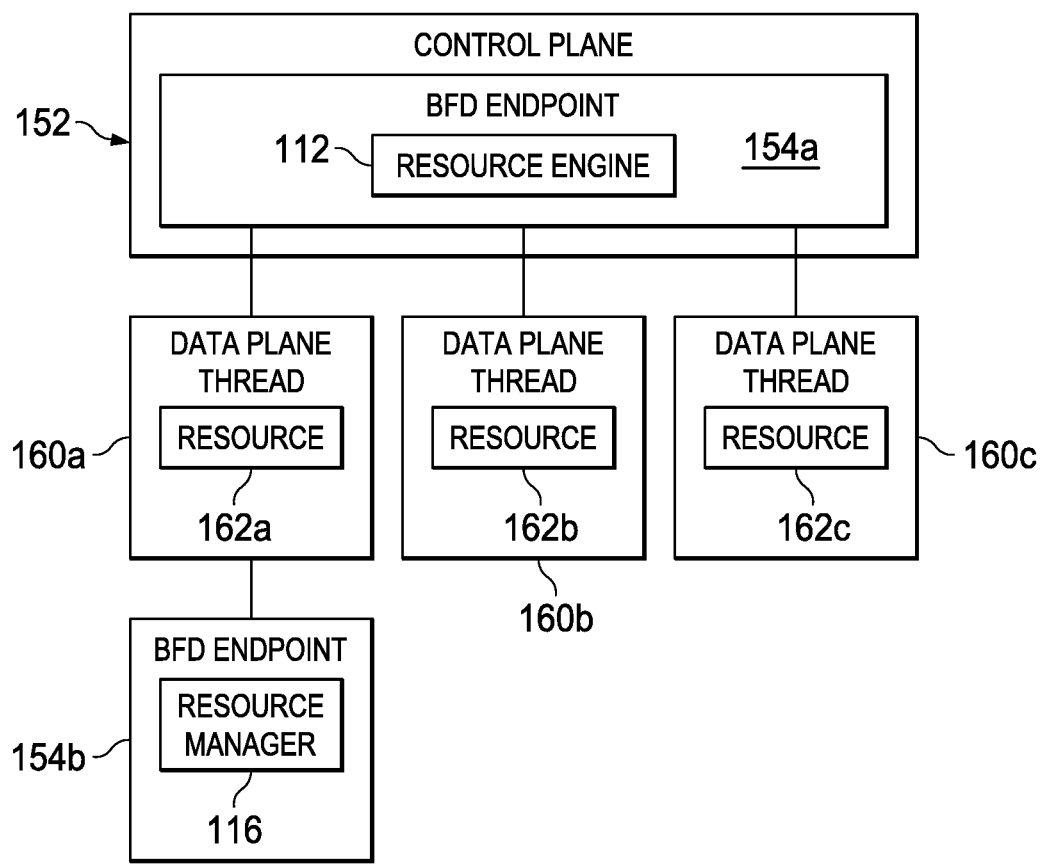
FIG. 5 is a simplified block diagram of a communication system for resource monitoring, in accordance with an embodiment of the present disclosure.

Turning to FIG. 5, FIG. 5 is a simplified block diagram of a portion of communication system 100, in accordance with an embodiment of the present disclosure. As illustrated in FIG. 5, a control plane 152 can include a BFD endpoint 154a (e.g., network elements 104a-104c, electronic devices 106a-106h, systems 108a-108c, cloud services 118, etc.). BFD endpoint 154a can include a resource engine 112. A second BFD endpoint 154b can include a resource manager 116. In an example, using resource manager 116, second BFD endpoint 154b can send a ping, status request, link monitoring message, etc. to BFD endpoint 154a. Using resource engine 112, BFD endpoint 154a can determine that resources 162a-162c are associated with the ping or status request. Resource engine 112 can receive the request, determine the status of resources 162a-162c, summarize the response from resources 162a-162c, and communicate a single response back to resource manger 116 in second BFD endpoint 154b.

Control plane 152 can part of a router architecture that is concerned with drawing the network topology or the information in a routing table that defines what to do with incoming packets. Functions of control plane 152 can include participating in routing protocols, system configuration, management, exchange of routing table information, etc. Control plane 152 can be configured to exchange the topology information with routers and construct a routing table based on a routing protocol, for example, routing information protocol (RIP), open shortest path first (OSPF), or border gateway protocol (BGP), etc. Resources 162a-162c may be on the same data plane, forwarding plane, or may have their own data plane thread. For example, resource 162a may be in data plane thread 160a, resource 162b may be in data plane thread 160b, and resource 162c may be in data plane thread 160c.

Figure 6:
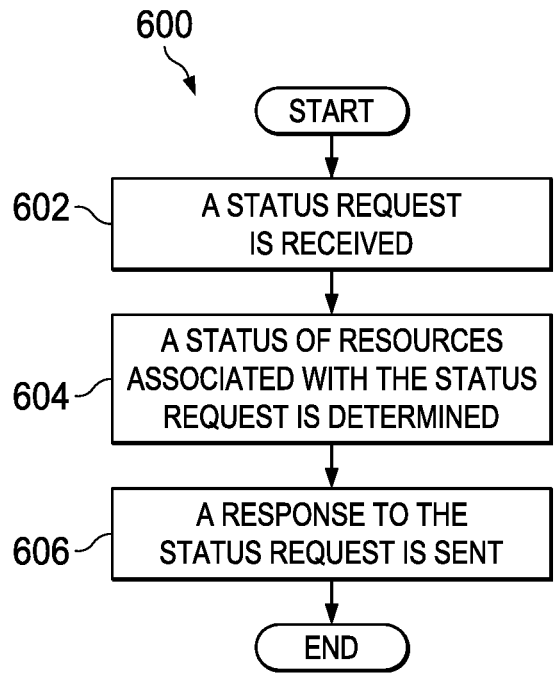
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with resource monitoring, in accordance with an embodiment. In an embodiment, one or more operations of flow 600 may be performed by resource engine 112 and resource manager 116. At 602, a status request (e.g., link monitoring message) is received. At 604, a status of resources associated with the status request (e.g., link monitoring message) is determined. At 606, a response to the status request (e.g., link monitoring message) is sent.

Figure 7:
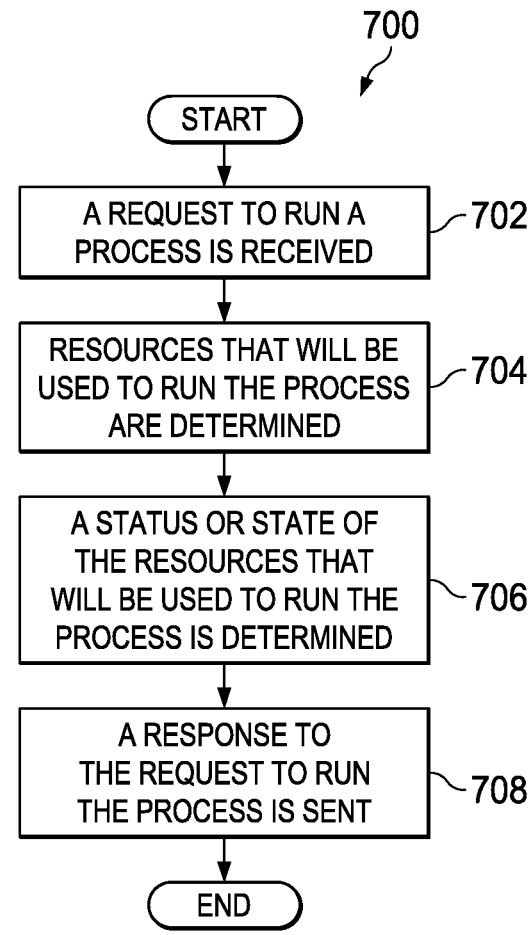
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with resource monitoring, in accordance with an embodiment. In an embodiment, one or more operations of flow 700 may be performed by resource engine 112 and resource manager 116. At 702, a request to run a process is received. At 704, resources that will be used to run the process are determined. At 706, a status or state of the resources that will be used to run the process is determined. At 708, a response to the request to run the process is sent.

Note that with the examples provided herein, interaction may be described in terms of two, three, or more network elements. However, this has been completion for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 6-7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to receive a link monitoring message, determine two or more resources associated with the link monitoring message, determine a status of each of the one or more resources, and send a response, where the response includes an indication of the status of each of the two or more resources.

In Example C2, the subject matter of Example C1 can optionally include where the link monitoring message is a request to execute a process and the two or more resources are to be used during execution of the process.

In Example C3, the subject matter of any one of Examples C1-C2 can optionally include where the link monitoring message is part of a bidirectional forwarding detection packet.

In Example C4, the subject matter of any one of Examples C1-C3 can optionally include a resource table at least partially used to determine the two or more resources associated with the process.

In Example C5, the subject matter of any one of Examples C1-C4 can optionally include where at least one of the resources is a core from a multi-core processor.

In Example C6, the subject matter of any one of Examples C1-05 can optionally include where at least one of the resources is a virtual machine.

In Example C7, the subject matter of any one of Examples C1-C6 can optionally include where the link monitoring message is received by a virtual switch.

In Example C8, the subject matter of any one of Examples C1-C7 can optionally include where the response includes data related to the status of each resource.

In Example A1, an apparatus can include memory, a resource engine, and at least one processor. The at least one processor can be configured to cause the resource engine to receive a link monitoring message, determine one or more resources associated with the link monitoring message, where at least one of the one or more resources is located in a second apparatus, determine a status of each of the one or more resources, and send a response, where the response includes an indication of the status of each of the one or more resources.

In Example, A2, the subject matter of Example A1 can optionally include where the link monitoring message is a request to execute a process and the one or more resources are to be used during execution of the process.

In Example A3, the subject matter of any one of Examples A1-A2 can optionally include where the link monitoring message is part of a bidirectional forwarding detection packet.

In Example A4, the subject matter of any one of Examples A1-A3 can optionally include a resource table, where the resource table is used to determine the one or more resources associated with the process.

Example M1 is a method including receiving a link monitoring message at a network element, determining one or more resources associated with the link monitoring message, where at least one of the one or more resources is located in a second network element, determining a status of each of the one or more resources, and sending a response that provides an indication of the status of each of the one or more resources.

In Example M2, the subject matter of Example M1 can optionally include where the link monitoring message is a request to execute a process and the one or more resources are to be used during execution of the process.

In Example M3, the subject matter of any one of the Examples M1-M2 can optionally include where the link monitoring message is part of a bidirectional forwarding detection packet.

In Example M4, the subject matter of any one of the Examples M1-M3 can optionally include where a resource table located in the network element is at least partially used to determine the one or more resources associated with the process.

In Example M5, the subject matter of any one of the Examples M1-M4 can optionally include where at least one of the resources is a core from a multi-core processor.

In Example M6, the subject matter of any one of Examples M1-M5 can optionally include where at least one of the resources is a virtual machine.

Example S1 is a system for resource monitoring, the system can include memory, one or more processors, and a resource engine located in a network element. The resource engine can be configured to receive a link monitoring message, determine two or more resources associated with the link monitoring message, determine a status of each of the two or more resources, and send a response, where the response includes an indication of the status of each of the two or more resources.

In Example S2, the subject matter of Example S1 can optionally include where the link monitoring message is a request to execute a process and the two or more resources are to be used during execution of the process.

In Example S3, the subject matter of any one of the Examples S1-S2 can optionally include where the link monitoring message is part of a bidirectional forwarding detection packet.

In Example S4, the subject matter of any one of the Examples S1-S3 can optionally include a resource table located in the memory, where the resource table is at least partially used to determine the two or more resources associated with the process.

In Example S5, the subject matter of any one of the Examples S1-S4 can optionally include where at least one of the resources is a core from a multi-core processor.

In Example S6, the subject matter of any one of the Examples S1-S5 can optionally include where at least one of the resources is a virtual machine.

In Example S7, the subject matter of any one of the Examples S1-S6 can optionally include where the network element is a virtual switch.

Example AA1 is an apparatus including means for receiving a link monitoring message, means for determining two or more resources associated with the link monitoring message, means for determining a status of each of the two or more resources, and means for sending a response, where the response includes an indication of the status of each of the two or more resources.

In Example AA2, the subject matter of Example AA1 can optionally include where the link monitoring message is a request to execute a process and the two or more resources are to be used during execution of the process.

In Example AA3, the subject matter of any one of Examples AA1-AA2 can optionally include where the link monitoring message is part of a bidirectional forwarding detection packet.

In Example AA4, the subject matter of any one of Examples AA1-AA3 can optionally include where a resource table is at least partially used to determine the two or more resources associated with the process.

In Example AA5, the subject matter of any one of Examples AA1-AA4 can optionally include where at least one of the resources is a core from a multi-core processor.

In Example AA6, the subject matter of any one of Examples AA1-AA5 can optionally include where at least one of the resources is a virtual machine.

In Example AA7, the subject matter of any one of Examples AA1-AA6 can optionally include where the link monitoring message is received by a virtual switch.

In Example AA8, the subject matter of any one of Examples AA1-AA7 can optionally include where the response includes data related to the status of each resource.

Example X1 is a machine-readable storage medium including machine-readable instructions to implement a method or realize an apparatus as in any one of the Examples A1-A4 or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, cause the at least one processor to:
   receive, at a virtual switch, a link monitoring message that is a part of a bidirectional forwarding detection packet;
   determine two or more resources associated with the link monitoring message, wherein at least a portion of the two or more resources includes a core from a multi-core processor and one or more virtual switching resources;
   determine a status of each of the two or more resources; and
   send a response, wherein the response includes an indication of the status of each of the two or more resources.

2. The at least one non-transitory machine readable medium of claim 1, wherein the link monitoring message is related to a request to execute a process and the two or more resources are to be used during execution of the process.

3. The at least one non-transitory machine readable medium of claim 1, wherein a resource table is at least partially used to determine the two or more resources associated with the link monitoring message.

4. The at least one non-transitory machine readable medium of claim 1, wherein at least one of the resources is a virtual machine.

5. The at least one non-transitory machine readable medium of claim 1, wherein the response includes data related to the status of each of the two or more resources.

6. An apparatus comprising:
   memory;
   a resource engine; and
   at least one processor, wherein the at least one processor is configured to cause the resource engine to:
   receive at a virtual switch, a link monitoring message that is a part of a bidirectional forwarding detection packet;
   determine two or more resources associated with the link monitoring message, wherein at least a portion of the two or more resources includes a core from a multi-core processor and one or more virtual switching resources, wherein at least one of the two or more resources is located in a second apparatus;
   determine a status of each of the two or more resources; and send a response, wherein the response includes an indication of the status of each of the two or more resources.

7. The apparatus of claim 6, wherein the link monitoring message is related to a request to execute a process and the two or more resources are to be used during execution of the process.

8. The apparatus of claim 6, further comprising:
a resource table, wherein the resource table is at least partially used to determine the two or more resources associated with the link monitoring message.

9. The apparatus of claim 6, wherein at least one of the resources is a virtual machine.

10. The apparatus of claim 6, wherein the response includes data related to the status of each of the two or more resources.

11. A method comprising:
receiving at a virtual switch, a link monitoring message that is a part of a bidirectional forwarding detection packet;
determining two or more resources associated with the link monitoring message, wherein at least a portion of the two or more resources includes a core from a multi-core processor and one or more virtual switching resources, wherein at least one of the two or more resources is located in a second network element;
determining a status of each of the two or more resources; and
sending a response that provides an indication of the status of each of the two or more resources.

12. The method of claim 11, wherein the link monitoring message is related to a request to execute a process and the two or more resources are to be used during execution of the process.

13. The method of claim 11, wherein a resource table located in the network element is used to determine the two or more resources associated with the link monitoring message.

14. The method of claim 11, wherein at least one of the resources is a virtual machine.

15. The method of claim 11, wherein the response includes data related to the status of each of the two or more resources.

16. A system for resource monitoring, the system comprising:
memory;
one or more processors; and
a resource engine located in a network element, wherein the resource engine is configured to:
receive at a virtual switch, a link monitoring message that is a part of a bidirectional forwarding detection packet;
determine two or more resources associated with the link monitoring message, wherein at least a portion of the two or more resources includes a core from a multi-core processor and one or more virtual switching resources;
determine a status of each of the two or more resources; and
send a response, wherein the response includes an indication of the status of each of the two or more resources.

17. The system of claim 16, wherein the link monitoring message is related to a request to execute a process and the two or more resources are to be used during execution of the process.

18. The system of claim 16, further comprising:
a resource table located in the memory, wherein the resource table is at least partially used to determine the two or more resources associated with the link monitoring message.

19. The system of claim 16, wherein at least one of the resources is a virtual machine.

20. The system of claim 16, wherein the response includes data related to the status of each of the two or more resources.

* * * * *